UNITED STATES PATENT OFFICE.

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN.

PROCESS OF MAKING BROMIN.

1,141,922.  Specification of Letters Patent.  Patented June 8, 1915.

No Drawing.  Application filed November 7, 1911.  Serial No. 658,938.

*To all whom it may concern:*

Be it known that I, EDWIN O. BARSTOW, a citizen of the United States, and a resident of Midland, county of Midland, and State of Michigan, have invented a new and useful Improvement in Processes of Making Bromin, of which the following is a specification, the principle of the invention being herein explained and the best mode in which I have contemplated applying that principle, so as to distinguish it from other inventions.

In the ordinary method of manufacturing liquid bromin, the mother liquid obtained by concentration of the natural brine is boiled with an acid and an oxidizing agent, whereby the bromin is liberated. The latter, together with the accompanying steam, is then cooled and condensed to bromin and water, the bromin being subsequently separated by stratification, since it is but slightly soluble in water and is of a different specific gravity. This method of manufacturing bromin, however, proves expensive because of the great weight of the solution from which the bromin is distilled, a large size apparatus being required to handle the volume of liquid involved, and a large amount of heat being necessary in order to bring the solution to the boiling point and continue the boiling during the distillation proper.

The object of the present invention is to provide a method of making liquid bromin which will not require any distillation of the bromin in the form of bromin vapor by means of steam; instead the bromin is at once obtained in desired liquid form, separable by gravity from the accompanying liquid.

To the accomplishment of the foregoing and related ends the invention then consists of the steps hereinafter described and particularly pointed out in the claims.

It should be explained, however, that while the following description sets forth in detail an approved mode of carrying out the invention, such disclosed mode constitutes but one of the various ways in which the principle of the invention may be used.

In carrying out my present improved process, a strong solution of a bromid and a bromate is made up, sodium bromid and sodium or potassium bromate being usually employed in this connection. The bromid is furthermore used in the proportion of five molecules to one of the bromate. The solution thus prepared is run into a cement lined tub provided with a cement covered agitator and a lead cooling coil, or otherwise constructed to permit of the agitation and cooling of its contents, which include sulfuric acid in addition to such solution and so are more or less corrosive in character.

The acid is added slowly, the solution being stirred the while and the temperature being kept down by means of the cooling coil, but still above the crystallizing point of the sulfate that is formed as a result of the reaction occurring. Such sulfuric acid is added in amount sufficient to combine with all the base of the bromid and bromate, so that the reaction may be represented by the following equation:—

$$5NaBr + NaBrO_3 + 3H_2SO_4 = 3Na_2SO_4 + 6Br + 3H_2O.$$

The liquid bromin, resulting from the foregoing, is precipitated as a heavy liquid that is only very slightly soluble in the strong sulfate solution produced at the same time.

After the addition of all the sulfuric acid, the solution is preferably cooled substantially to the crystallizing point of the sulfate, the bromin collecting on the bottom of the container so as to permit of its being drawn off from beneath the sulfate solution. It has been found that where sodium bromid, sodium bromate and sulfuric acid are used, about ninety five per cent. (95%) of the bromin in the bromid and bromate can be drawn off as liquid bromin, only a small quantity remaining dissolved in the sulfate solution. Such traces of bromin as do remain in the solution can be recovered, if desired, by blowing the same out with a current of air and absorbing them, as for example, in an alkali solution.

From the foregoing description it will be seen that it is possible to obtain the desired product, namely, liquid bromin, as a direct result of the single reaction involved in the process. This is accomplished without any wasteful expenditure of heat, in the form of steam, and at the same time does away with the necessity of handling hot bromin vapors, which are not only very corrosive, but very unpleasant to deal with.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. The process of making bromin which consists in reacting upon a solution of a bromid and a bromate with sulfuric acid, whereby a sulfate solution is formed and bromin set free, the solution of bromid and bromate being sufficiently strong to cause such freed bromin to collect as a liquid, substantially as described; and then separating the bromin from such sulfate solution by gravity.

2. In a process of making bromin, the step which consists in reacting upon a solution of a bromid and a bromate with sulfuric acid, whereby a sulfate solution is formed and bromin set free, the solution of bromin and bromate being sufficiently strong to cause such freed bromin to collect as a liquid, substantially as described.

3. In a process of making bromin, the step which consists in reacting upon a solution of the bromid and bromate of an alkali metal with sulfuric acid, whereby a sulfate solution of such metal is formed and bromin set free, the solution of bromid and bromate being sufficiently strong to cause such freed bromin to collect as a liquid, substantially as described.

4. In a process of making bromin, the step which consists in reacting upon a solution of the bromid and bromate of an alkali metal with sulfuric acid, whereby a sulfate solution of such metal is formed and bromin set free, the bromid used being in the proportion of five molecules to one of the bromate and the solution of such bromid and bromate being sufficiently strong to cause such freed bromin to collect as a liquid, substantially as described.

Signed by me this 3rd day of November, 1911.

EDWIN O. BARSTOW.

Attested by—
ANNA L. GILL,
JNO. F. OBERLIN.